May 16, 1933.   A. O. APPELBERG   1,908,676
ELECTRICAL REGULATING DEVICE
Filed June 27, 1930

Inventor
A.O. Appelberg
By Marks Clark
Attys.

Patented May 16, 1933

1,908,676

UNITED STATES PATENT OFFICE

AXEL OSVALD APPELBERG, OF STOCKHOLM, SWEDEN, ASSIGNOR TO AKTIEBOLAGET BIRKA REGULATOR, OF STOCKHOLM, SWEDEN, A COMPANY OF SWEDEN

ELECTRICAL REGULATING DEVICE

Application filed June 27, 1930, Serial No. 464,386, and in Sweden July 6, 1929.

It is previously known to regulate the current supply to electrical apparatus, such as heating apparatus, by means of a thermostat switch connected into the main circuit and operating as an automatic interrupter. The heating circuit of said switch is then controlled by a regulating resistance connected into a branch of the main circuit. The regulation is then brought about by the variation of the heating current by means of the regulating resistance, the frequency of the automatic interruptions or the ratio between the closing and opening periods respectively being then varied. In this known arrangement the regulation may only take place stepwise and it is not possible to obtain suitable ratios between the different regulating steps without using special resistances particularly designed for the purpose. According to the present invention a completely continuous regulation of the current supply to the apparatus is obtained by replacing the regulating resistance by a thermostatic auxiliary switch adapted to be set for different sensitivities and which is shunted to a part of the main circuit, series connected with the contact of the main thermostat, and which is adapted, upon its shifting under the influence of an appertaining heating resistance energized over the main thermostat contact, to connect the heating resistance of the main thermostat into circuit. The variation of the frequency of the automatic interrupter or of the ratio between the closing and opening periods respectively in this case is brought about by varying the interval of time during which the heating resistance of the main switch remains de-energized at the beginning of each period which interval of time will be longer the less sensitively the auxiliary thermostat is set. The contact of the main switch is preferably disposed inside a receptacle evacuated or filled with an indifferent gas. The auxiliary switch is, on the other hand, preferably disposed in air because then better regulating possibilities are afforded. The latter switch may otherwise, according to the invention, be adapted to only operate as current closer, it being then always interrupted in currentless condition.

Figure 1:
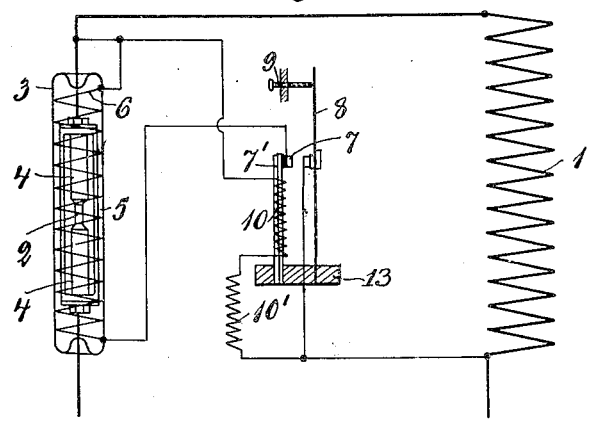
Figure 2:
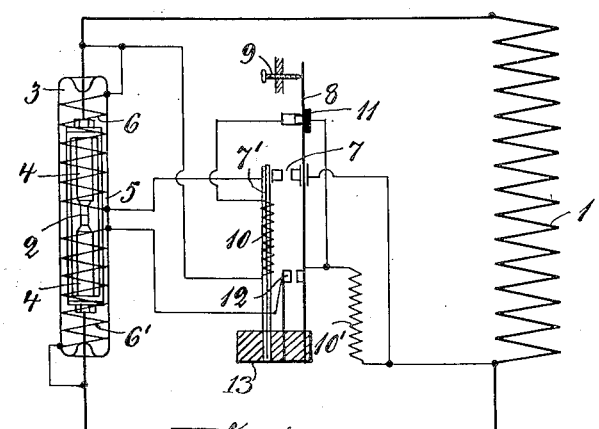
Figure 3:
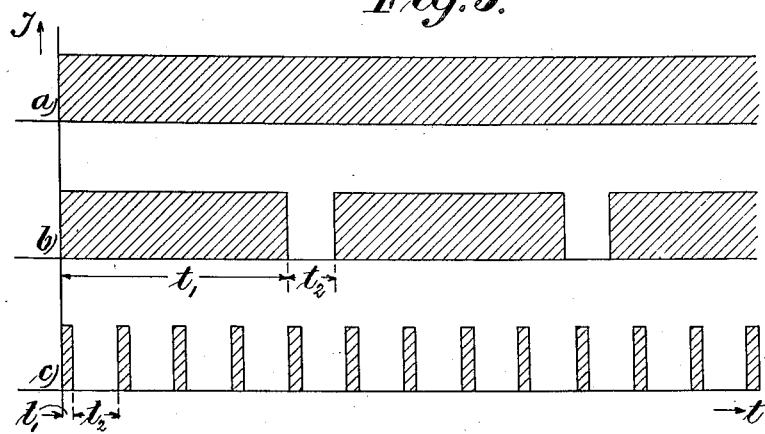

This invention will be more closely described with reference to the accompanying drawing in which Figure 1 is a circuit diagram of an embodiment of the invention. Figure 2 shows a modification of the circuit arrangement according to Figure 1. Figure 3 is a diagram illustrating the regulating operation.

The consumption apparatus 1, by way of example the heating resistance in a heating apparatus, is normally connected into circuit through the main thermostat switch contact 2. Said contact is enclosed in a gas tightly sealed receptacle 3 of glass or the like which is evacuated or filled with an indifferent gas. The switch is constituted by two rods 4 coaxially disposed in the receptacle, the ends of which rods facing each other normally make contact with each other and which at their opposite ends are insulated and secured to the ends of an enclosing frame or sleeve 5 of a material having a high coefficient of expansion. The heating resistance 6 of the main switch is wound outside the receptacle 3. Said heating winding is series connected with the thermostat auxiliary switch 7 and together with said switch connected across the consumption resistance 1. The auxiliary switch consists of a bi-metallic rod 7' carrying the one contact of the switch whereas the opposing contact is carried by an elastically disposed blade spring 8. The bimetallic rod 7' and the spring 8 may be secured at their lower ends in a support 13. The latter may by means of an adjustment screw 9 be set in different positions, whereby the size of the normally open contact gap of the switch may be adjusted at will. The bi-metallic rod 7' is provided with a heating winding 10 which, in series with the series resistance 10', is parallel connected with the consumption resistance 1.

The movable parts are shown in Figure 1 in those positions which they take up at the beginning of a regulating period. The main contact 2 has just been closed and the heating winding of the bi-metallic rod has then been closed at the same time as the main circuit. The contact part carried by the bi-metallic rod thus approaches the counter contact with which it makes contact after an interval of time, the length of which is dependent upon the setting of the blade spring 8 by means of the adjustment screw 9. Upon closing the contact 7 the heating winding 6 of the main thermostat is connected into circuit and after another short interval of time the main contact 2 is interrupted, both the consumption resistance 1 and the heating windings of both thermostats being then disconnected. The consumption resistance 1 has thus, counted from the beginning of the period, been connected into circuit during a total time $t_1$, Figure 3b, corresponding to the sum of the intervals of time required for the shifting of the two thermostats under the influence of their heating windings. The consumption resistance remains now disconnected during such a long time $t_2$ which is required for the cooling down and restoration of the main thermostat to its original closed position. After the lapse of the time $t_2$, the arrangement is thus restored to the condition shown in Figure 1 and a new regulating period begins. Figure 3b represents the case that the auxiliary thermostat 7 is set to a comparatively low degree of sensitivity. The current supply to the consumption resistance 1 is evidently proportional to the ratio $$\frac{t_1}{t_1+t_2}$$

If it is desired to increase the current supply, the adjustment screw 9 is turned further forward the elastic rod 8 being then bent more backward and the contact gap of the auxiliary thermostat further increased. On the other hand, if it is desired to decrease the current supply, the adjustment screw 9 is turned backwards the contact gap being then decreased so that the time $t_1$ for the current closing intervals is shortened. The interval of time $t_2$ remains on the other hand substantially unaltered. The current supply to the consumption apparatus may in this manner be practically reduced at will as is clearly understood by Figure 3c corresponding to a comparatively sensitive setting of the auxiliary thermostat. Figure 3a represents the case that the consumption apparatus 1 is continuously energized, by way of example, by screwing the adjustment screw 9 so far forward that the contact part carried by the bi-metallic rod does not reach the counter contact.

As is understood by the preceding description, the contact 7 always is in de-energized condition when it is opened. Without the slightest inconvenience said contact may therefore be disposed in air and may thus easily be made adjustable.

The embodiment according to Figure 2 differs from the one above described by the provision of special arrangements to make the auxiliary thermostat inoperative by means of the operating member 9 intended for the regulation when it is desired to feed the consumption apparatus 1 continuously or when it is desired to completely disconnect the consumption apparatus. For this purpose a normally closed contact 11 is connected into circuit in series with the heating winding 9 of the auxiliary thermostat, the one contact part of which contact is carried by the blade spring 8, adjustable by means of the adjustment screw 9 in the auxiliary thermostat, and co-operates with an elastic counter-contact. The contact 11 is interrupted when the screw 9 is screwed inwards so far that the blade spring 8 exceeds its extreme regulating position on the right hand side. Then the heating winding of the auxiliary thermostat is disconnected the auxiliary thermostat being then made inoperative. As then the contact 7 is held open also the heating winding of the main thermostat is permanently disconnected and the consumption apparatus 1 is then maintained permanently connected into circuit.

In the circuit arrangement according to Figure 2 the main thermostat is also provided with an additional heating winding 6' which, in similarity with the winding 6, is wound outside the glass tube 3. In series with the winding 6', a normally open contact 12 is connected into circuit, the one contact part of which is carried by the elastic rod or the blade spring 8. The contact 12 is closed when the adjustment screw 9 is screwed outwards so far that the blade spring 8 exceeds its extreme left hand regulating position. Then the auxiliary winding 6' is connected into circuit in series with the series resistance 10' between the terminals of the supply mains. While the winding 6, normally operative, is so designed that a comparatively rapid interruption of the main contact 2 is brought about, upon the connecting into circuit of said winding, the auxiliary winding 6' is, on the other hand, preferably made with such a high resistance that the heat developed therein is only just sufficient to maintain the main thermostat in open position. If the main thermostat should not be interrupted at that instant when the auxiliary winding 6' is connected into circuit at the contact 12 the interruption takes place under the influence of the heat development in the main winding 6 which thereupon, in similarity with the consumption apparatus 1, is held disconnected, whereas the auxiliary winding 6' alone is held energized.

Instead of effecting the regulation of the sensitivity of the auxiliary switch in a purely mechanical way as in the shown embodiments one may bring about the regulation of the sensitivity also electrically by means of a regulating resistance connected into the heating circuit of the auxiliary switch by means of which resistance the amperage in the heating winding 10 may be varied. If desired, both regulating devices may be combined so that the sensitivity of the auxiliary switch is adjustable both mechanically by varying the amplitude of the shifting motion of the thermostat member 7', deformable by the influence of heat, and electrically by means of a regulating resistance. The series resistance 10', Figure 1, may by way of example represent such a regulating resistance by means of which the sensitivity of the auxiliary thermostat may be adjusted.

I claim:—

1. A regulating device for varying the current supply to electrical consumption apparatus comprising in combination, a main thermal switch in series with the consumption apparatus and enclosed in a sealed receptacle, a heating resistance for said main switch, an auxiliary thermal switch thermally separated from the consumption apparatus and adapted to control the circuit of the heating resistance of the said main switch, means for adjusting the sensitivity of said auxiliary switch, and a separate heating resistance for said auxiliary switch connected in shunt with the consumption apparatus so as to be supplied with current through the main switch independently of the current through the consumption apparatus.

2. A regulating device for varying the current supply to electrical consumption apparatus comprising in combination, a main thermal switch in series with the consumption apparatus and enclosed in a sealed receptacle, a heating resistance for said main switch, an auxiliary thermal switch thermally separated from the consumption apparatus and adapted to control the circuit of the heating resistance of the said main switch, setting means for adjusting the sensitivity of said auxiliary switch, a separate heating resistance for said auxiliary switch connected in shunt with the consumption apparatus so as to be supplied with current through the main switch, and a normally closed contact in series with the heating winding of the auxiliary switch arranged under the control of said setting means in such a manner as to be opened in a setting position corresponding to a lower limit of the sensitivity of the auxiliary switch.

3. A regulating device for varying the current supply to electrical consumption apparatus comprising in combination, a main thermal switch in series with the consumption apparatus and enclosed in a sealed receptacle, a heating resistance for said main switch, an auxiliary thermal switch thermally separated from the consumption apparatus and adapted to control the circuit of the heating resistance of the said main switch, setting means for adjusting the sensitivity of said auxiliary switch, a separate heating resistance for said auxiliary switch connected in shunt with the consumption apparatus so as to be supplied with current through the main switch, and an additional heating winding for the main switch connected in parallel with said switch so as to be energized upon interruption of the main switch.

4. A regulating device as claimed in claim 3, characterized in that a normally interrupted contact is connected in series with the additional heating winding of the main switch and arranged under the control of the setting means in such a manner as to be closed in a setting position corresponding to an upper limit of the sensitivity of the auxiliary switch.

5. A circuit arrangement as claimed in claim 3, characterized in that the resistance of the auxiliary heating winding is so selected that the amount of heat developed therein is sufficient to hold the main thermostat interrupted.

In testimony whereof I affix my signature.

AXEL OSVALD APPELBERG.